United States Patent [19]

Bickel

[11] Patent Number: 5,119,500
[45] Date of Patent: Jun. 2, 1992

[54] METEOR BURST COMMUNICATION SYSTEM

[75] Inventor: John E. Bickel, San Diego, Calif.

[73] Assignee: The United States of America as represented by the Secretary of the Navy, Washington, D.C.

[21] Appl. No.: 759,091

[22] Filed: Sep. 5, 1991

Related U.S. Application Data

[63] Continuation of Ser. No. 419,402, Oct. 10, 1989, abandoned.

[51] Int. Cl.$^5$ .............................................. H04B 7/14
[52] U.S. Cl. ....................................... 455/15; 455/69; 455/49.1
[58] Field of Search ...................... 455/7, 9, 13, 15, 19, 455/63, 69, 343, 49; 340/825.08

[56] References Cited

U.S. PATENT DOCUMENTS 4,630,314  12/1986  Smith ..................................... 455/64
4,685,149  8/1987  Smith et al. ........................... 455/52

OTHER PUBLICATIONS

Bickel, "Meteor Burst Communication Buoy Relay Tests".
Bickel et al., "Buoy Relay for Meteor Burst Communication Systems", Jun. 1987.
Bickel et al., "Preliminary Design Options for Meteor Burst Communications Systems Buoy Relays", Dec. 1986.
Leader et al., "Meteor Burst Communications System Relay Suspended from a High-Altitude Balloon", Sept. 1982.

Primary Examiner—Reinhard J. Eisenzopf
Assistant Examiner—Edward Urban
Attorney, Agent, or Firm—Harvey Fendelman; Thomas G. Keough; Michael A. Kagan

[57] ABSTRACT

A meteor burst communication network is disclosed that consists of a plurality of meteor burst communication stations that relay radio messages off of meteor burst trails from one station to another. Each station includes an antenna operably coupled to a receiver and transmitter, a display, a message input device, a computer operably connected to the aforementioned equipment, and a clock that provides a time base to the computer. The computer provides instructions to the transmitter and outputs to a display. The program determines if a message has been received by the receiver. If a message has been received, it is stored in the computer memory. The computer then instructs the transmitter to transmit a probing message for a predetermined period of time. If a response to the probing message has been detected by the receiver, the computer directs the transmitter to cease transmitting the probing message, transmit the message, and purge the message from memory after an acknowledgement message is received that the message was received. In cases where the probing message has been transmitted for a period in excess of the predetermined period, the computer directs the transmitter to cease transmitting and purge the message from memory. Messages may also be input into the station through the message input device.

18 Claims, 5 Drawing Sheets

METEOR BURST COMMUNICATION SYSTEM

STATEMENT OF GOVERNMENT INTEREST

The invention described herein may be manufactured and used by or for the Government of the United States of America for governmental purposes without the payment of any royalties thereon or therefore.

This is a continuation of application Ser. No. 419,402, filed Oct. 10, 1989, now abandoned.

BACKGROUND OF THE INVENTION

It is well known that when meteors are vaporized through impact with the earth's atmosphere, long trails of ionization at altitudes of 80 to 120 km are formed which can function as high altitude reflectors of very high frequency (VHF) radio transmissions. The trails are short-lived (up to about 10 seconds with a medium value of about 0.3 seconds) because of dissipation. These trails are cylinders of ionization, tens of kilometers in length, with a radius a thousand times smaller. Of the total of about $10^{20}$ meteors entering the atmosphere each day, about $10^{12}$ have a mass large enough to produce effective reflecting trails. Each hour, several hundred such trails are positioned and aligned properly to allow scattering or specular reflection of a VHF signal between two given geographical locations separated by a distance which may be up to about 2000 kilometers (1200 statute miles).

Figure 1:
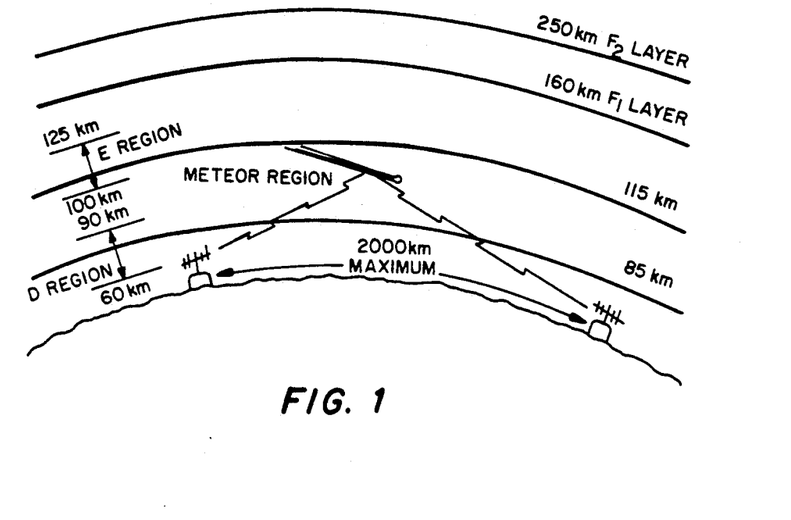
FIG. 1 is a diagram of a meteor burst communication link illustrating the height of the meteor region within the ionosphere and the maximum range of communications associated with a single link.

The intermittent nature of an ionization trail makes it particularly suitable for short messages which can be transferred via radio waves reflected off of a single ionized meteor trail. A MBCS typically includes one or more master stations and many remote stations. In a typical MBCS, a master station continuously transmits a probing signal intended to be received by one or more remote stations. When a "called" station receives this signal, it immediately answers the master station via the same reflecting meteor trail. Each station can then transmit and receive traffic alternately or simultaneously at data rates of up to many thousands of bits per second per frequency channel during the life of the trail. Many frequency channels can be operated simultaneously and high average data transmission rates can be achieved. FIG. 1 is a diagram of an MBCS link illustrating the height of the meteor region within the ionosphere and the maximum range of communications associated with it.

U.S. Pat. Nos. 4,277,845 and 4,685,149 (a division of U.S. Pat. No. 4,277,845) disclose a meteor burst communication system that includes at least two master stations, remotely spaced with respect to each other, that are associated with a plurality of groups of remote stations spaced at locations distant from the master stations. Each group of remote stations is associated with one of the master stations. Each master station includes a radio transmitter for transmitting probing digital radio signals encoded with address information. The probing signals are directed from the master station for reflection from meteor trails to remote stations having the specific addresses encoded in the master station transmission. Each of the remote stations includes a radio receiver for receiving the reflected probing digital radio signals from a master station and at least one sensor for detecting environmental characteristics such as snow depth or rain fall. The remote stations each include a transmitter for transmitting digital data representative of the output of the associated sensor to the master station via reflection from a meteor vapor trail if the received address portion of the probe compares with the stored digital address sequence in accordance with predetermined criteria.

U.S. Pat. No. 4,630,314 discloses a meteor burst communication system utilizing a master station and a large number of remote stations. A master station transmits a probing radio signal which, when reflected from a suitably positioned meteor trail is received by a remote station. The remote station verifies that the received signal is being transmitted by a master station and then decides whether to respond to the probing signal, depending upon a number of internal factors, including whether it has data available to send and when it last transmitted data to the master station. The master station can also address specific remote stations or address messages to all remote stations simultaneously.

Figure 2:
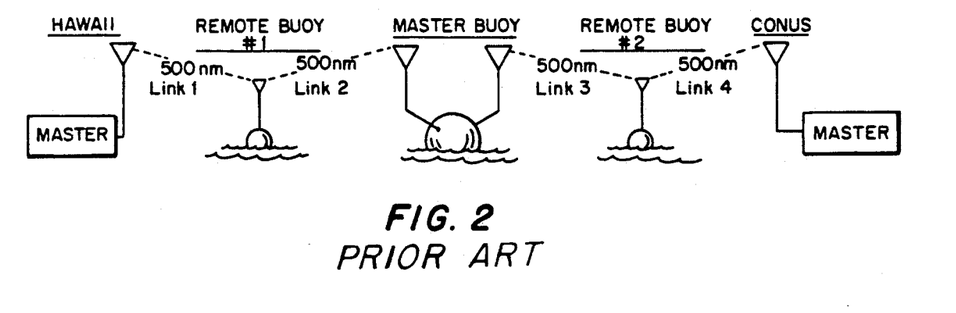
FIG. 2 is a diagram of a conventional meteor burst communication relay system consisting of an alternating series of master and remote stations that serially communicate from one station to the next station over the length of the system.

Each of the meteor burst communication systems described above is designed to provide a communicative link between a master station and one or more of many remote stations. The maximum range of such a system is approximately 2,000 kilometers. However, certain applications require conveying messages beyond this limited distance. The range of communications using meteor burst signals can be extended beyond 2,000 kilometers by serially relaying messages from one MBCS link to another. This type of system, illustrated in FIG. 2, requires an alternating series of master and remote stations that span the distance over which the communication link is to function, where the distance between stations does not exceed approximately 2,000 kilometers. By way of example, the communication link depicted in FIG. 2 is of a type that may extend between Hawaii and the continental United States. Each master and remote station pair form a communication link. A series of such links form a communication network which may be, but is not necessarily, terminated at each end by a master station. All of the master stations continuously probe (or intermittently probe with a rapid transmit/receive cycle), typically consuming several hundred watts of DC power to produce sufficient radio frequency (RF) power. The master stations simultaneously or alternately "listen" for a response from the "called" remote stations, positioned at the other end of each link. The transmitters are computer controlled and are programmed so that when a meteor forms a properly positioned trail of ionization, a remote station receives transmissions and acknowledges the master station probe by transmitting a response. In one mode of operation, the two stations can then alternately send messages to each other using the same frequency, or simultaneously using different frequencies, until the ionized trail decays. The master station then resumes its probing function as a master station, consuming power at a high rate while it probes and listens for a response from a remote station, if additional information is to be sent by either station. The remote station, which receives the transmission from the first master station, transmits a message intended to be detected by a second master station after it receives a probe from this second master station. The second master station is continuously probing to establish another communication link. When this third link is established, the second master station will then transmit the message to a second remote station, more distant from the first master station than the first remote station. This process is repeated until the message is received at the other end of the communication network.

Master stations consume great amounts of energy compared to the energy consumption of a remote station because the master station transmits continuously. For example, to only maintain the emergency operational readiness of a network, a continuously functioning master stations must nominally consume 600 watts of power to maintain a 300 RF watt probing transmitter, requiring 432 kw hours of energy per month. This compares with only 1.1 kw hours of energy consumption to maintain a continuously functioning remote station receiver and processor circuitry for the same period. In other words, 400 times more energy is required to operate a master station than to operate a remote station. If the master station is powered by a battery, as is typically the case for a remotely located master station, the physical size of the battery, determined by total energy system requirements and by the energy density of the battery, complicates the design, storage, logistics, and deployment of the master station. If a way could be found to operate a remote master station so that it transmits a probe only when there is a message to transmit, the design and deployment of such a master station could be simplified. Such a master station could operate on station longer than a continuously transmitting master station for a given sized battery. Therefore, a need exists for a meteor burst communication network wherein each station transmits only when there is a message to transmit.

SUMMARY OF THE INVENTION

The present invention overcomes the shortcomings of meteor burst communication systems (MBCS) which transmit probing messages continuously even though there may be no message to send. The present invention provides a meteor burst communication station that comprises a receiver, a transmitter, an antenna operably connected to the receiver and transmitter; and a computer operably connected to the transmitter and receiver. The computer is operated by a program that provides instructions to a memory address of the computer and to the transmitter. The program determines if a message has been received by the MBCS receiver. If a message has been received, it is stored in the computer. A message may also be entered into the computer by another message input device, such as a keyboard, another radio receiver, laser or acoustic receiving device. The program then instructs the transmitter to transmit a probing message for a predetermined period of time if there is a message in storage to be transmitted. The program then determines if a response to the probing message has been received by the receiver. If a response to the probing message has been received, the program directs the transmitter to cease transmitting the probing message, transmit the message, and then purge the message from the computer when an acknowledgement of message transfer has been received. In cases where the probing message has been transmitted for a period in excess of the predetermined period, the program directs the transmitter to cease transmitting and purge the message from the computer. A clock provides a time base to the computer. The system may be powered by a battery connected to the receiver, transmitter, computer, and all other electronic or electrical devices, especially if the MBCS station is at a remote location such as on a buoy in the ocean, on a mountain top, or at another location where another electrical power source is not available.

Figure 3:
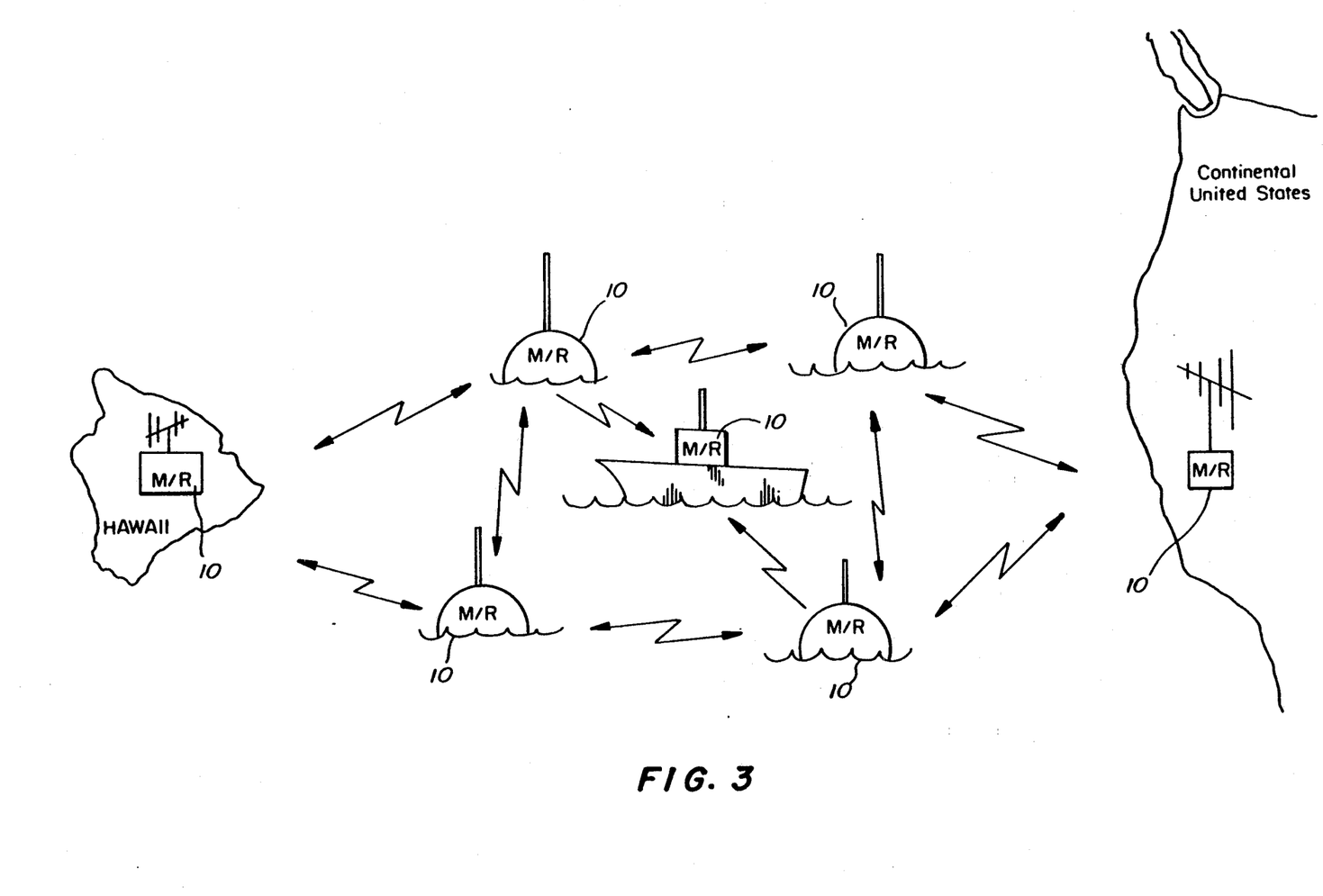
FIG. 3 is a diagram of one embodiment of the present invention that includes a communicative network consisting of a plurality of relay stations that convey a message from one station to another between Hawaii and the continental United States.

The present invention also includes a plurality of master/remote (M/R) stations, such as stations 10, illustrated in FIG. 3, that comprise a communication network. The stations are deployed in a manner which enables a radio message to be received by a station, retransmitted by that same station, reflected off of a meteor trail, and then received by another station which repeats this process. The message is serially conveyed from one station to another by being reflected off of meteor trails until the message is received by the station to which the message is addressed.

OBJECTS OF THE INVENTION

An object of the present invention is to provide a meteor burst communication system which efficiently utilizes available meteor trails for relaying a message from one end to another of a communication network spanning distances up to several times 2,000 kilometers.

A second object of the present invention is to provide a meteor burst communication system comprised of stations that each change from the normally operating receiving mode of a remote station to the probe transmitting mode of a master station only when there is a message to transmit.

A third object of the present invention is to provide a meteor burst communication system comprised of stations which minimize power consumption by avoiding unnecessary transmissions.

A fourth object of the present invention is to provide a meteor burst communication station which efficiently utilizes available meteor trails for relaying messages.

A fifth object of the present invention is to provide a meteor burst communication station that transmits a probing message for no more than a predetermined period of time when there is a message to transmit and operates in a receiving mode when there is no message to transmit.

These and other objects of the invention will become more readily apparent from the ensuing description and claims when taken with the appended drawings.

DESCRIPTION OF THE PREFERRED EMBODIMENT

Figure 4:
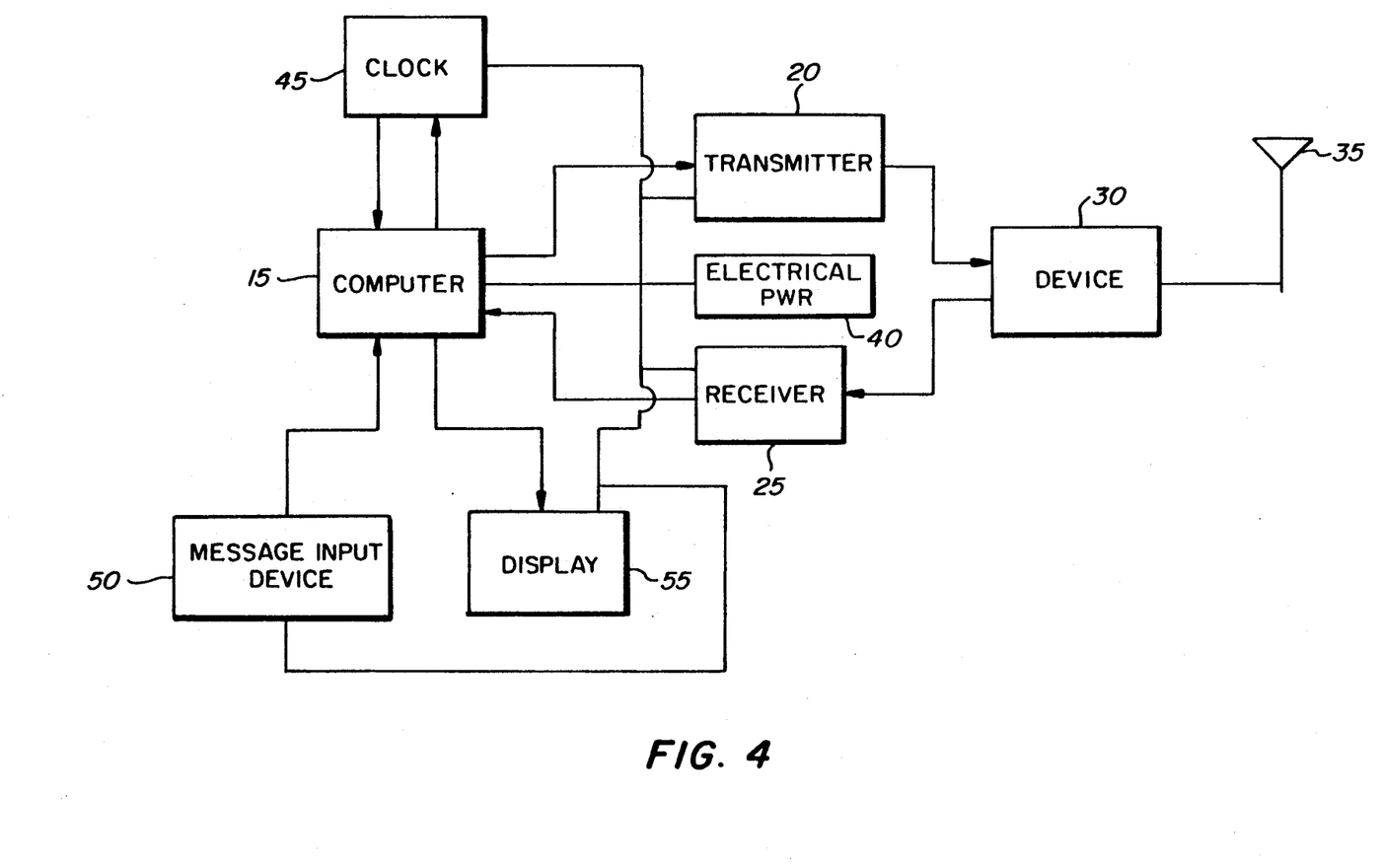
FIG. 4 is a functional block diagram of a station of the present invention.

Referring to FIG. 3, one aspect of the present invention is a meteor burst communication system that includes two or more master/remote (M/R) stations 10 which are selectively operated in both master and remote station modes in response to certain stimuli as explained more fully herein. A master station transmits a probing message continuously whenever there is a message to send. A remote station normally operates in a receiving mode in order to "listen" for messages and attempts to relay such messages by retransmitting them when a communicative link is established with a master station. Station 10 is another aspect of the present invention. By way of example only, FIG. 3 illustrates a meteor burst communication network consisting of a plurality of stations 10 that may be supported on buoys floating on the ocean surface that comprise a meteor burst communication system for relaying messages between two locations separated by a great distance such as Hawaii and the continental United States. It is to be understood that the scope of the invention also comprehends the deployment of stations 10 on land masses which may be remote from populated areas, on Arctic Ocean ice, or even a combination of water, land, or ice borne stations 10 operating in conjunction with each other. M/R stations 10 may also operate in conjunction with master stations located within the network and/or with continuously operating remote stations at other locations with a the network. The basic components of station 10 are illustrated in block diagram format in FIG. 4 where there is shown computer 15 that controls the operation of station 10 in accordance with a set of software instructions described in greater detail hereinafter, radio frequency (RF) transmitter 20, preferably operating in the low VHF range, RF receiver 25, clock 45, and device 30, which may be an antenna transmit/-receive switch when transmitter 20 and receiver 25 operate at the same frequency in a simplex mode, or may be a duplexer when transmitter 20 and receiver 25 operate at different frequencies in a duplex mode. Device 30 operably couples transmitter 20 and receiver 25 to antenna 35. Computer 15 receives incoming messages from receiver 25 and provides outgoing messages and instructions to transmitter 20. Power is supplied to computer 15, transmitter 20, receiver 25, and clock 45 by electrical power source 40. For applications where station 10 is deployed in areas remote from commercial electrical power supplies, such as, at sea or at other desolate regions, power supply 40 may be, for example, a rechargeable battery and a wind generator, solar powered electrical power supply, sea water battery, wave generator, or other device for recharging the battery. Clock 45 provides a time base to computer 15 and may be initialized by a signal from computer 15. Optionally, one or more message input devices, such as message input device 50 illustrated in FIG. 4, which may be for example, a terminal keyboard or another receiver, may be operably coupled to provide an input to computer 15. Another option is for display 55, shown in FIG. 4, to be operably coupled to receive the output of computer 15. By way of example, display 55 may be a printer or video display as would be used when a particular station 10 is operated or monitored by personnel. Message input device 50 enables messages to be manually or automatically input in to a message storage device, such as the memory of computer 15 which are then transmitted by transmitter 20. Display 55, when implemented as a printer, provides a hard copy of messages received by receiver 25.

Figure 5:
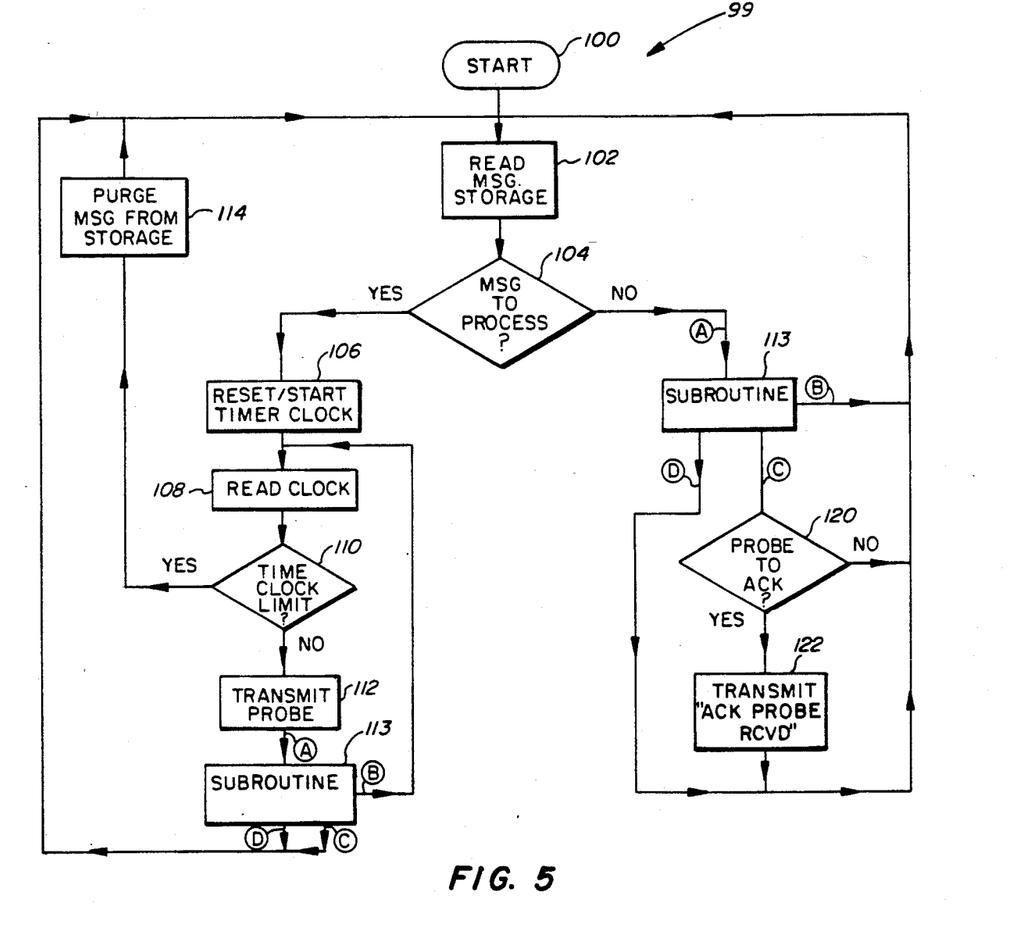
FIG. 5 is a flowchart of the software for each station of the present invention.
Figure 6:
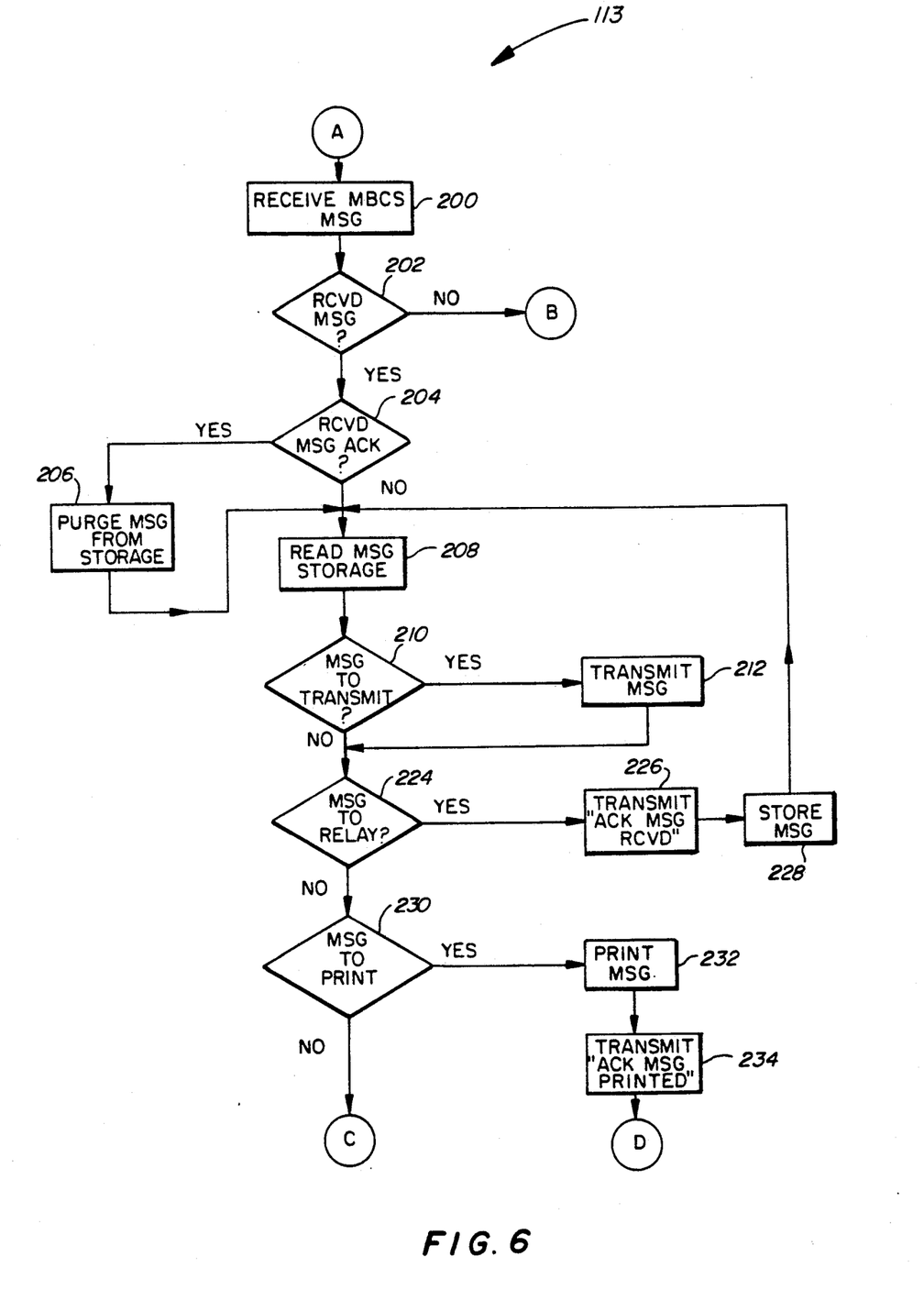
FIG. 6 is a flowchart of a subroutine utilized by the software illustrated in FIG. 5.

A flow chart of the software controlling the operation of computer 15, and hence the operation of station 10 is illustrated in FIGS. 5 and 6. Software program 99 is illustrated in FIG. 5 and subroutine 113 of software program 99 is illustrated in FIG. 6. Assuming an initial state where station 10 is operating in a receiving mode with no message to transmit and no message stored in the memory of computer 15, software program 99 is entered at 100, as illustrated in FIG. 5. Software program 99 reads the memory of computer 15 at 102 and determines whether there is a message to process at 104. Two types of messages may be stored in the memory of computer 15 as follows: (1) a message to relay from one station to another (MSG TO RELAY); and (2) a message intended for the station personnel which needs to be printed (MSG TO PRINT) or displayed. These messages are provided by receiver 25 or by message input device 50 to computer 15. If there is no message to process, i.e., no message has been input into computer 15 by message input device 50 or received by receiver 25 and stored in the memory of computer 15, the decision at 104 (MSG TO PROCESS?) is "NO" and software program 99 enters subroutine 113 at 200 which instructs receiver 25 to continue to "listen" for MBCS messages. Subroutine 113 then determines at 202 whether a message has been received by receiver 25. If the decision at 202 of is "NO", software program 99 exits subroutine 113 at "B" and returns to 100. More simply stated, if there is no message to send, station 10 operates in a standard remote station mode, i.e., it continues to listen.

If the determination at 104 (MSG TO PROCESS?) is "YES", software program 99 proceeds to step 106 which provides an instruction to initialize clock 45, which runs continuously, to zero. Clock 45 is read at 108 and a determination is made at 110 (TIME CLOCK LIMIT?) as to whether the output of clock 45 has exceeded a predetermined limit, which may for example be 15 minutes or any other suitable period. If the decision at 110 is "YES," software program 99 proceeds to 114 which provides an instruction that the message be purged from the memory of computer 15. If the decision at 110 (TIME CLOCK LIMIT?) is "NO", step 112 provides an instruction to transmit a probe. If station 10 is operating in a simplex mode, where transmitter 20 and receiver 25 are set to operate alternately at the same frequency, the probe typically may be 20 m seconds long, followed by a 40 m second period in which receiver 25 "listens" for a response. In this operating mode, device 30 is an antenna switch. If transmitter 20 and receiver 25 are operated on different frequencies, the probe may be continuous, where no "off" periods are necessary for receiving a possible response to the continuous probe. In this operating mode, device 30 is an antenna duplexer.

After software program 99 step 112 provides instructions to transmit a probe, software program 99 enters subroutine 113 at 200, described below.

Subroutine 113 is entered at 200 which provides an instruction to receiver 25 to "listen" for an MBCS message and then determines if a message has been received at 202. If the determination at 202 is "NO", subroutine 113 is exited at "B" and proceeds to 108 to read clock 45. If the determination at 202 (RCVD MSG?) is "YES", subroutine 113 proceeds to step 204 (RCV "MSG ACK"?) which determines if the received message is an acknowledgement that a message has been received. If the determination at 204 is "YES", subroutine 113 proceeds to 206 which provides an instruction to purge the message from the memory of computer 15. Subroutine 113 proceeds to 208 which instructs computer 15 to read the memory of computer 15. If the determination at 204 is "NO", subroutine 113 proceeds directly to 208. Next, subroutine 113 determines if there is a message to transmit at 210 (MSG TO TRANSMIT?). If the determination at 210 is "YES", subroutine 113 proceeds to 212 which provides an instruction to transmit the message and then goes to 224 which determines if there is a message to relay (MSG TO RELAY?). If the determination at 210 is "NO", i.e., there is no message to transmit, subroutine 113 proceeds directly to 224. If the determination at 224 is "YES", (there is a message to relay) subroutine 113 goes to 226 which provides an instruction to transmit an acknowledgement that the message has been received, then to 228, which instructs that the message be stored in the memory of computer 15. Subroutine 113 then returns to 208, "READ MSG STORAGE."

If the determination at 224 (MSG TO RELAY?) is "NO", subroutine 113 proceeds to 230 which determines whether there is a message to print or display (MSG TO PRINT). If the determination at 230 is "YES", then step 232 provides printer 55 with an instruction to print or display the message and then an instruction at 234 to transmit an acknowledgement message that the received message has been printed ("ACK MSG PRINTED"). The program then exits subroutine 113 at "D." If the determination at 230 is "NO", i.e. that there is no message to print, subroutine 113 is exited at "C."

Referring to FIG. 5, if the determination at 104 (MSG TO PROCESS?) is "YES", and subroutine 113 is exited at "B", then program 99 returns to 108 to read clock 45, which has been incrementing since being initialized at 106. If the determination at 104 (MSG TO PROCESS?) is "YES", and subroutine 113 is exited at "C" OR "D", program 99 proceeds to 102 (READ MSG STORAGE).

When the determination at 104 (MSG TO PROCESS?) is "NO", program 99 enters subroutine 113 at 200 and proceeds as described above. In such circumstances, if subroutine 113 is exited at "B" or "D", program 99 proceeds to 102. Alternatively, if subroutine 113 is exited at "C", program 99 proceeds to 120 (PROBE TO ACK) where a decision is made as to whether there is probe to acknowledge. If the decision at 120 is "NO", program 99 goes to 102. If the decision at 120 is "YES", program 99 proceeds to 122 which provides an instruction to transmit an acknowledgement message that a probe has been received (TRANSMIT "ACK PROBE RCVD"), and then goes to 102.

A typical message transfer between two M/R stations 10 of a meteor burst communication network, such as illustrated in FIG. 3, is summarized below. Assume one M/R station 10, designated as station "A", has a message to send to another M/R station 10, designated as station "B". Station "A" transmits a probe in accordance with step 112 of its program 99. Station "B" receives the probe when a properly positioned meteor trail occurs. Station "B" transmits an acknowledgement that the probe has been received in accordance with step 122 of its program 99. Station "A" then receives the message the acknowledgement probe was received by station "B". Next, station "A" transmits the message in accordance with step 212 of subroutine 113. If station "B" receives the message, station "B" transmits an acknowledgement that the message was received per step 226 of its subroutine 113 and stores the message in accordance with step 228. If station "A" receives the acknowledgement that the message was received by station "B", station "A" will purge the message from storage per step 206 of subroutine 113, unless station "A" is programmed to transmit the message to more than one station, in which case station "A" will continue to attempt to transmit the message. If the message is short, all of the above transmissions are propagated via the same meteor trail. If the message is long, one or more meteor trails may be used to transfer the message.

A person of ordinary skill in this art can easily program a computer in accordance with the flow charts illustrated in FIGS. 5 and 6 and couple it to a transmitter and receiver, as described herein.

Thus, it can be readily appreciated that the meteor burst communication system in accordance with the present invention provides efficient utilization of the limited energy stored in a battery by functioning as a master station, i.e., continuously probing, only when there is a message in memory to transmit, or as a remote station when there is no message to transmit.

It is to be understood that the scope of the invention also includes a meteor burst communication system consisting of a plurality of stations 10 that are in meteor burst communication range (up to about 2,000 km) of a central station 10 which may transmit to and receive transmissions from the other stations.

I claim:

1. A master/remote meteor burst communication station that selectively switches between remote and master station operational modes, comprising:
   a radio frequency receiver;
   a radio frequency transmitter;
   an antenna operably coupled to said receiver and transmitter;
   a computer operably coupled to sad transmitter and said receiver;
   program means for operating said computer,
      said program determining if a message has been received by said receiver,
      said program directing said computer to store said message in said computer,
      said program directing said computer to direct said transmitter to be in non-transmitting operational mode if no message has been received by said receiver so as to maintain said station in said remote station operational mode;
      said program directing said computer to direct said transmitter to transmit a probing message for a predetermined period of time if said message has been received, thereby changing said station from said remote to said master station operational mode,
      said program determining if a response to said probing message has been received by said receiver,
      said program directing said transmitter to cease transmitting said probing message and then directing said computer to purge said message from said computer if said predetermined period of time has been exceeded, thereby changing said station from said master to said remote station operational mode said program directing said computer to direct said transmitter to transmit said message if said message has not been purged from said computer, and said program directing said message to be purged from said computer if an acknowledgement message has been received by said receiver; and a clock operably coupled to said computer for providing a time base to said computer; and a power source operably coupled to said receiver, transmitter, clock, and said computer.

2. The meteor burst communication system of claim 1 wherein:

said program means is computer software.

3. The meteor burst communication station of claim 2 which further includes:

an input device operably coupled to said computer for entering messages in to said computer that are to be transmitted by said transmitter.

4. The meteor burst communication system of claim 3 in which:

said input device is a keyboard.

5. The meteor burst communication system of claim 3 in which:

said input device is a receiver.

6. The meteor burst communication station of claim 2 which further includes:

a display operably coupled to said computer for displaying messages received by said receiver.

7. The meteor burst communication station of claim 6 in which:

said display is a printer.

8. The meteor burst communication station of claim 6 in which:

said display is a video display terminal.

9. The meteor burst communication station of claim 2 wherein:

said transmitter transmits at a frequency, f; and
said receiver receives at said frequency, f.

10. The meteor burst communication station of claim 9 which further includes:

an antenna switch operably coupled between said transmitter and said antenna, said switch further being operably coupled between said receiver and said antenna.

11. The meteor burst communication station of claim 2 wherein:

said transmitter and said receiver operate in a simplex mode.

12. The meteor burst communication station of claim 11 which further includes:

a duplexer operably coupled to said transmitter, receiver, and antenna.

13. The meteor burst communication station of claim 11 which further includes:

an antenna switch operably coupled to said transmitter, receiver, and antenna.

14. A method for operating a master/remote meteor burst communication station that selectively switches between remote and master station operational modes, comprising the steps of:

(a) operating a receiver in a receiving mode to detect a message;

(b) storing a detected message in a memory storage device;

(c) maintaining a transmitter in a non-transmitting mode if no message has been received so as to maintain said station in a remote station operational mode;

(d) transmitting a probing message for a predetermined period of time in response to said receiver receiving said detected message, thereby changing said station from said remote to a master station operational mode;

(e) operating said receiver in a receiving mode to detect a response to said probing message;

(f) ceasing to transmit said probing message and then purging said message from said memory if said predetermined period of time is exceeded, thereby changing said station from said master to said remote station operational mode;

(g) transmitting said message in response to receiving said response to said probe message if said message has not been purged from said memory;

(h) purging said message from said memory after receiving an acknowledgement message that said message has been received; and (i) repeating steps (a) through (h).

15. A master/remote meteor burst communication system that selectively switches between remote and master station operational modes, comprising:

a plurality of stations serially deployed from one end of a communication network to a second end of a communication network, said stations deployed so that a radio message can be serially transferred from said first end to said second end of said communication network, said message being reflected off of at least one meteor burst trail, each station comprising:

a radio frequency receiver;

a radio frequency transmitter;

an antenna operably coupled to said receiver and transmitter;

a computer operably coupled to sad transmitter and said receiver;

program means for operating said computer, said program determining if a message has been received by said receiver, said program directing said computer to store said message in said computer, said program directing said computer to direct said transmitter to be in non-transmitting operational mode if no message has been received by said receiver so as to maintain said station in said remote station operational mode;

said program directing said computer to direct said transmitter to transmit a probing message for a predetermined period of time if said message has been received, thereby changing said station from said remote to said master station operational mode, said program determining if a response to said probing message has been received by said receiver, said program directing said transmitter to cease transmitting said probing message and then directing said computer to purge said message from said computer if said predetermined period of time has been exceeded, thereby changing said station from said master to said remote station operational mode, said program directing said computer to direct said transmitter to transmit said message if said message has not been purged from said computer, and said program directing said message to be purged from said computer if an acknowledgement message has been received by said receiver;

a clock operably coupled to said computer for providing a time base to said computer; and a power source operably coupled to said receiver, transmitter, clock, and said computer.

16. The meteor burst communication system of claim 15 wherein:

said program means is computer software.

17. A meteor burst communication system, comprising:

a plurality of master/remote meteor burst communication stations deployed so that a radio message can be serially transferred between any of said stations by being reflected off of at least one meteor burst trail, each station comprising:

a radio frequency receiver;

a radio frequency transmitter;

an antenna operably coupled to said receiver and transmitter;

a computer operably coupled to sad transmitter and said receiver;

program means for operating said computer, said program determining if a message has been received by said receiver, said program directing said computer to store said message in said computer, said program directing said computer to direct said transmitter to be in non-transmitting operational mode if no message has been received by said receiver so as to maintain said station in said remote station operational mode;

said program directing said computer to direct said transmitter to transmit a probing message for a predetermined period of time if said message has been received, thereby changing said station from said remote to a master station operational mode, said program determining if a response to said probing message has been received by said receiver, said program directing said transmitter to cease transmitting said probing message and then directing said computer to purge said message from said computer if said predetermined period of time has been exceeded, thereby changing said station from said master to said remote station operational mode, said program directing said computer to direct said transmitter to transmit said message if said message has not been purged from said computer, and said program directing said message to be purged from said computer if an acknowledgement message has been received by said receiver; and a clock operably coupled to said computer for providing a time base to said computer; and a power source operably coupled to said receiver, transmitter, clock, and said computer.

18. The meteor burst communication system of claim 17 wherein:

said program means is computer software.

* * * * *